(12) United States Patent
Cai

(10) Patent No.: US 9,338,050 B2
(45) Date of Patent: May 10, 2016

(54) SHARED KEEP-ALIVE AND FAILURE DETECTION MECHANISM IN DISTRIBUTED NETWORK

(75) Inventor: Xuejun Cai, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 35 days.

(21) Appl. No.: 14/384,008

(22) PCT Filed: Mar. 27, 2012

(86) PCT No.: PCT/CN2012/073093
§ 371 (c)(1),
(2), (4) Date: Feb. 5, 2015

(87) PCT Pub. No.: WO2013/143065
PCT Pub. Date: Oct. 3, 2013

(65) Prior Publication Data
US 2015/0138948 A1   May 21, 2015

(51) Int. Cl.
*H04L 12/26* (2006.01)
*H04L 12/24* (2006.01)

(52) U.S. Cl.
CPC ........ *H04L 41/0654* (2013.01); *H04L 43/0817* (2013.01); *H04L 43/10* (2013.01); *H04L 41/0813* (2013.01)

(58) Field of Classification Search
None
See application file for complete search history.

(56) References Cited

U.S. PATENT DOCUMENTS

2006/0104210 A1* 5/2006 Nielsen .................. H04L 12/24
370/248

2010/0085948 A1* 4/2010 Yu .......................... H04L 12/66
370/338
2010/0201516 A1* 8/2010 Gelvin .................... H04L 67/12
340/539.26
2010/0208662 A1* 8/2010 Fuste Vilella ......... H04W 40/00
370/328

(Continued)

FOREIGN PATENT DOCUMENTS

| CN | 101442479 A | 5/2009 |
| CN | 101771579 A | 7/2010 |
| WO | 2006/135282 A1 | 12/2006 |

OTHER PUBLICATIONS

International Search Report issued in corresponding International application No. PCT/CN2012/073093, date of mailing Jan. 3, 2013.

(Continued)

*Primary Examiner* — Anh-Vu Ly
(74) *Attorney, Agent, or Firm* — Patent Portfolio Builders PLLC

(57) ABSTRACT

Node, computer readable medium and method for detecting a failed node in a structured network. The method includes assigning nodes of a neighboring set either to an active group or to a passive group, wherein the nodes of the neighboring set are connected to a current node; instructing active nodes in the active group to send a keep-alive query to the current node, wherein a timing for sending the keep-alive query from the active nodes to the current node is controlled by the current node; instructing passive nodes to listen for a keep-alive query from the current node and to reply with a keep-alive query response to the current node; configuring the current node to reply with a keep-alive query response to the active nodes; and determining the failed node based on (i) the keep-alive query response received from the passive nodes and (ii) the keep-alive query sent by the active nodes. The current node is configured to not send the keep-alive query to the active nodes and the passive nodes are configured to not send a keep-alive query to the current node.

20 Claims, 8 Drawing Sheets

(56) References Cited

U.S. PATENT DOCUMENTS

| | | | | |
|---|---|---|---|---|
| 2011/0096724 | A1* | 4/2011 | Lundstrom | H04L 43/10 370/328 |
| 2013/0007484 | A1* | 1/2013 | Gobriel | G06F 1/3209 709/217 |
| 2013/0234849 | A1* | 9/2013 | Gupta | G06Q 10/0833 340/539.11 |

OTHER PUBLICATIONS

Written Opinion of the International Searching Authority issued in corresponding International application No. PCT/CN2012/073093, date of completion Dec. 26, 2012.

Dedinski, I. et al., "Cooperative Keep-Alives: An Efficient Outage Detection Algorithm for P2P Overlay Networks," Seventh IEEE International Conference on Peer-to-Peer Computing, 2007, P2P 2007, Sep. 2-5, 2007, Galway, Ireland, pp. 140-150; IEEE Computer Society, Print ISBN: 978-0-7695-2986-8; DOI: 10.1109/P2P.2007.26.

Mahajan, Ratul et al., "Controlling the Cost of Reliability in Peer-to-Peer Overlays," Peer-to-Peer Systems II, Second International Workshop, IPTPS 2003, Berkeley, CA, USA, Feb. 21-22, 2003, DOI: 10.1007/978-3-540-45172-3_2.

Rowstron, Antony et al., "Pastry: Scalable, decentralized object location and routing for large-scale peer-to-peer systems," Proceedings of the IFIP/ACM International Conference on Distributed System Platforms (Middleware 2001), Heidelberg, Germany, Nov. 2001, pp. 329-350, ISBN: 3-540-42800-3.

Extended European Search Report in corresponding European Application No. EP 12 87 2523 dated Nov. 24, 2015.

P. Felber, et al.; "Failure Detectors as First Class Objects"; IEEE Computer Soc.; Proceedings of the International Symposium on Distributed Objects and Applications; Sep. 1999; pp. 132-141; XP010352190; Edinburgh, UK.

* cited by examiner

SHARED KEEP-ALIVE AND FAILURE DETECTION MECHANISM IN DISTRIBUTED NETWORK

TECHNICAL FIELD

The present invention generally relates to systems, software and methods related to keep-alive and failure detection mechanisms in a distributed network and, more particularly, to mechanisms and techniques for efficiently detecting a failed node in a distributed network.

BACKGROUND

Distributed networks are utilized today in various contexts, for example, for file sharing or voice-over-IP. The distributed networks include Grid, Cloud, Distributed Database and Peer-to-Peer (P2P) systems. They demonstrate the power of decentralized and self-organized resource location and usage in a flexible way.

A distributed network 100 includes, as shown in FIG. 1, a high number of nodes 102 (compared to conventional client-server networks) which are inter-connected to other nodes. To enable consistency and provide a designed application or service to a node, usually, the availability of nodes, links and/or resources (applications or services) is necessary to be known by the other nodes. Thus, in such a distributed system, the availability of nodes, links and/or resources is currently provided by some keep-alive (heartbeat) mechanisms in which short messages are exchanged periodically among the nodes to detect the failure/availability of nodes or links.

In other words, a node 104 sends a keep-alive message 106 to a neighbour node 108. If no reply is received at node 104 from the node 108, then node 104 assumes that node 108 is down (has failed). This is true for each node 102 of the network 100, i.e., each node of the network constantly probes other nodes to which it is connected. An important characteristic and also the main reason why the keep-alive mechanisms are used in the distributed networks is that the keep-alive mechanisms proactively allow the detection of a node or connection outage before these nodes and connections are needed by the underlying applications or services.

To enhance the availability of the nodes and/or services and to detect the failure as fast as possible, keep-alive messages need to be exchanged with a high frequency in the existing distributed networks. However, in strongly inter-connected, large-scale distributed network, heavy signaling and communication overhead among the nodes is introduced by the keep-alive mechanisms and, thus, the scalability of the network is limited. Therefore, there is a need for an efficient keep-alive and failure detection mechanism for the ever increasing distributed systems.

A couple of limitations of the existing mechanisms are now discussed. One mechanism used in the current distributed networks is the Basic Keep-alive (BK) mechanism as described by A. Rowstron and P. Druschel, "Pastry: Scalable, distributed object location and routing for large-scale peer-to-peer systems," in IFIP/ACM Middleware, 2001, and Mahajan et al., "Controlling the Cost of Reliability in P2P Overlays," Proc. IPTPS 2003. In this mechanism, a keep-alive query is sent from one node 104 to each neighbour node 108, 110, 112, 114 and 116 over the network and a keep-alive reply message is sent back by each neighbour node 108, 110, 112, 114 and 116 to the querying node 104. When the keep-alive reply message arrives, the querying node 104 knows that the other node is still alive and the link is functional. The keep-alive message transferring is initiated periodically, in both directions, every k seconds and k is called the keep-alive interval. The set of nodes (108, 110, 112, 114 and 116) directly connected to a node x (104) is called the neighbourhood set (N(x)) of node x.

With the BK mechanism, each node is managed independently of all other nodes in the system. For example, two nodes 104 and 120, both connected to a third node 108, do not share any information regarding their common node 108, so the keep-alive task must be performed twice, once by node 104 and once by node 120 for determining that node 108 is alive. This will result in two keep-alive messages per k seconds arriving at node 108 from nodes 104 and 120. Of course, node 108 may be connected to other nodes that also send keep-alive messages, thus further increasing the amount of messages received by node 108.

Although the BK mechanism is intuitive and easy to implement, the increasing of the system size or the inter-connection degree introduces a large amount of additional keep-alive signalling traffic, which degrade the performance of the distributed system.

To address this limitation of the basic keep-alive mechanism, Dedinski et al. ("Cooperative Keep-Alives: An Efficient Outage Detection Algorithm for P2P Overlay Networks," Peer-to-Peer Computing, 2007) have proposed a Cooperative Keep-alive (CK) mechanism. In this mechanism, all the nodes from the neighbourhood set of a target node continuously send keep-alive requests to the target node and the target node is configured to reply to the nodes from the neighbourhood set to ensure that the target node is still alive. The requests are sent with a certain frequency, controlled by the target node. The goal of the target node is to ensure that the frequency of all incoming keep-alive requests is close to the desired constant interval k, independently of the (usually changing) size of its neighbourhood set.

This is achieved by running two tasks at every node in the system, a sender task and a receiver task. Because every node in the network runs both tasks, the system is symmetric, i.e., there are no client or server roles. The main function of a sender task at a given node is to send keep-alive requests to the receiver tasks of the nodes in the neighbourhood of the given node, at pre-set times, and to process the replies. The sender task has a timetable, called sender schedule, in which the sending times are stored. The time for sending the next request to a particular neighbour node is extracted from the last keep-alive reply from that neighbour node. If the sender task of the given node sends a request to another node and the given node does not receive a reply from the another node, the request is repeated, at most r times, where r is a pre-defined retry count. After r retries, the sender task of the given node detects an outage of the another node and broadcasts this information to all neighbours of the another node by a sequential flooding technique.

Though the above mechanism reduces the amount of keep-alive messages exchanged among the nodes compared with the basic keep-alive mechanism, it still has the following disadvantages. First, the keep-alive message is unidirectional, i.e., the neighbour of the given node needs to actively send a request message to retrieve the status of all its neighbours.

Second, after a node fails, the keep-alive information is send by the given (detecting) node to all known neighbour nodes of the failed node. However, when sending out such information, it is possible that the given node cannot directly communicate with all the known neighbour nodes of the failed node. In this case, these nodes do not receive the failure information and can only detect the failed node by themselves, which require further messages. Thus, according to this mechanism, it will take longer for those nodes to detect the failed node. Such problem is neither considered nor solved by the above mechanism.

Thus, there is a need to develop a new and efficient keep-alive and failure detection mechanisms that reduce the failure detection time and the signalling cost in large-scale, distributed networks or systems, and, at the same time, preserves the effectiveness and reliability of the basic keep-alive mechanism.

SUMMARY

The possibility of having one or more failed nodes in a distributed network is likely. Thus, there is a need to have a mechanism (e.g., a method) in place that can detect the faulty node in an efficient and faster fashion than the existing mechanisms. In one exemplary embodiment, the nodes of the network are divided in passive and active nodes. A current node probes the passive but not the active nodes. When a failed node is detected, the current node informs the neighbors of the failed node but also tracks whether the neighbor nodes are reachable or not. The unreachable neighbor nodes are informed using alternative arrangements as discussed later.

According to one exemplary embodiment, there is a method for detecting a failed node in a structured network. The method includes a step of assigning nodes of a neighboring set either to an active group or to a passive group. The nodes of the neighboring set are connected to a current node. The method further includes a step of instructing active nodes in the active group to send a keep-alive query to the current node and a step of instructing passive nodes to listen for a keep-alive query from the current node and to reply with a keep-alive query response to the current node. The method also includes a step of configuring the current node to reply with a keep-alive query response to the active nodes. The current node determines the failed node based on (i) the keep-alive query response received from the passive nodes and (ii) the keep-alive query sent by the active nodes. The current node is configured to not send the keep-alive query to the active nodes and the passive nodes are configured to not send a keep-alive query to the current node.

According to another exemplary embodiment, there is a node configured to detect a failed node in a structured network. The node includes a processor configured to assign nodes of a neighboring set to either an active group or to a passive group. The nodes of the neighboring set are connected to the current node. The node also includes an interface that is configured to receive a keep-alive query from active nodes and send a keep-alive query to passive nodes and receive a keep-alive query response from the passive nodes. The interface also sends a keep-alive query response to the active nodes in response to the keep-alive query. The processor determines the failed node based on (i) the keep-alive query response received from the passive nodes and (ii) the keep-alive query sent by the active nodes. The current node is configured to not send the keep-alive query to the active nodes.

According to still another exemplary embodiment, there is a computer readable medium including computer executable instructions, wherein the instructions, when executed by a processor, implement the above-noted method.

Thus, it is an object to overcome some of the deficiencies discussed in the previous section and to provide a mechanism that determines a failed node with less message exchanges and also informs the neighbor nodes of the failed node, in a safer manner. One or more of the independent claims advantageously provides such a mechanism for determining the failed node.

LIST OF ABBREVIATIONS

BK Basic Keep-alive
CK Cooperative Keep-alive
NST Neighbor Set Table
ANL Active Neighbor List
PNL Passive Neighbor List
KQ Keep-alive Query
KQR keep-alive Query Response
KN Keep-alive Notify
KNR Keep-alive Notify Response
KNF Keep-alive Notify Forward
TCP Transmission Control Protocol
UDP User Datagram Protocol

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a distributed network in which a distributed protocol (e.g., P2P Chord) is established so that any node knows its neighbor nodes. However, the novel embodiments are not limited to a given distributed protocol, but may be applied to other types of underlying protocols.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, there is a method for detecting a failed node in a structured network. The method assigns the neighboring nodes of a current node to an active group or a passive group. The nodes from the active group are instructed to send a keep-alive query to the current node and the nodes from the passive group are instructed to listen for a keep-alive query from the current node and to reply with a keep-alive query response to the current node. The current node is configured to reply with a keep-alive query response to the active nodes and to determine a failed node based on (i) the keep-alive query response received from the passive nodes and (ii) the keep-alive query sent by the active nodes. The current node is configured to not send the keep-alive query to the active nodes, to reduce the traffic, and the passive nodes are configured to not send a keep-alive query to the current node to further reduce the traffic.

Figure 1:
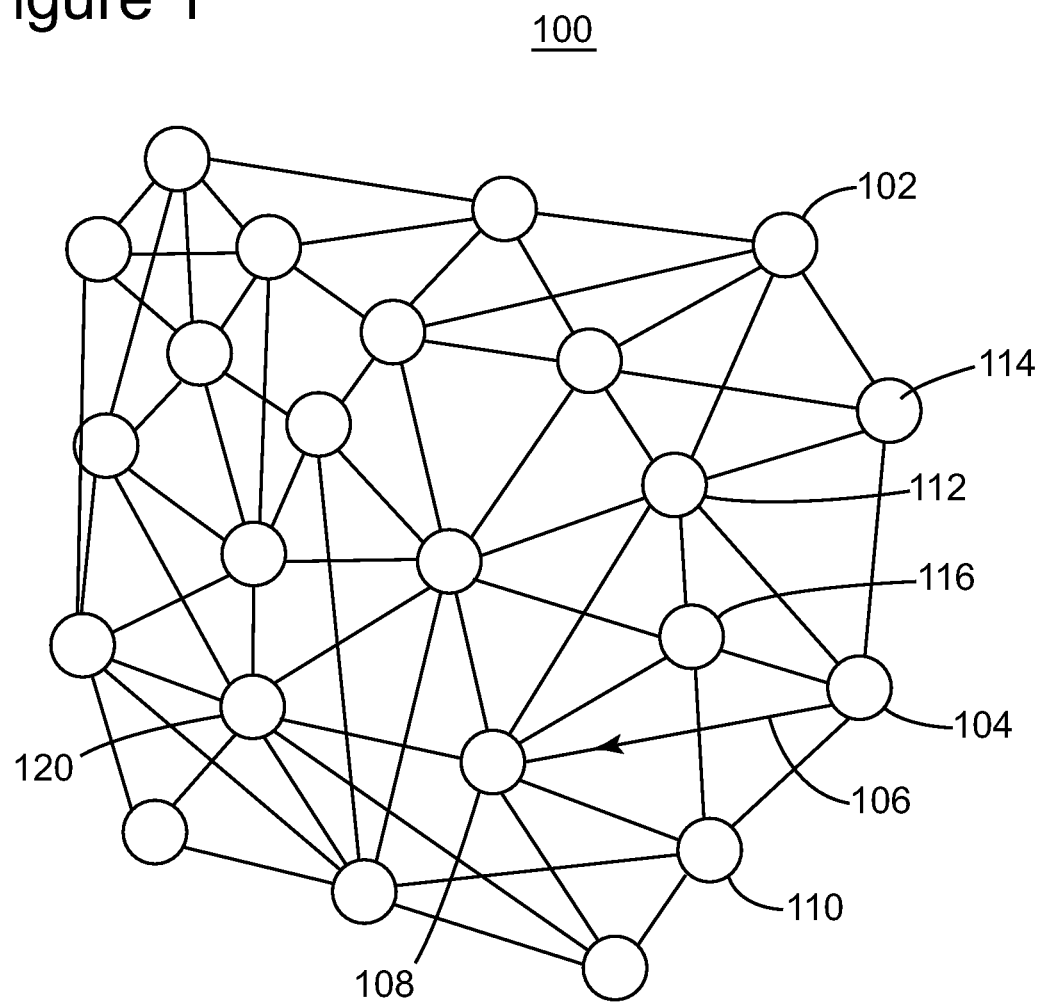
FIG. 1 is a schematic diagram of a communication network having plural nodes.
Figure 2:
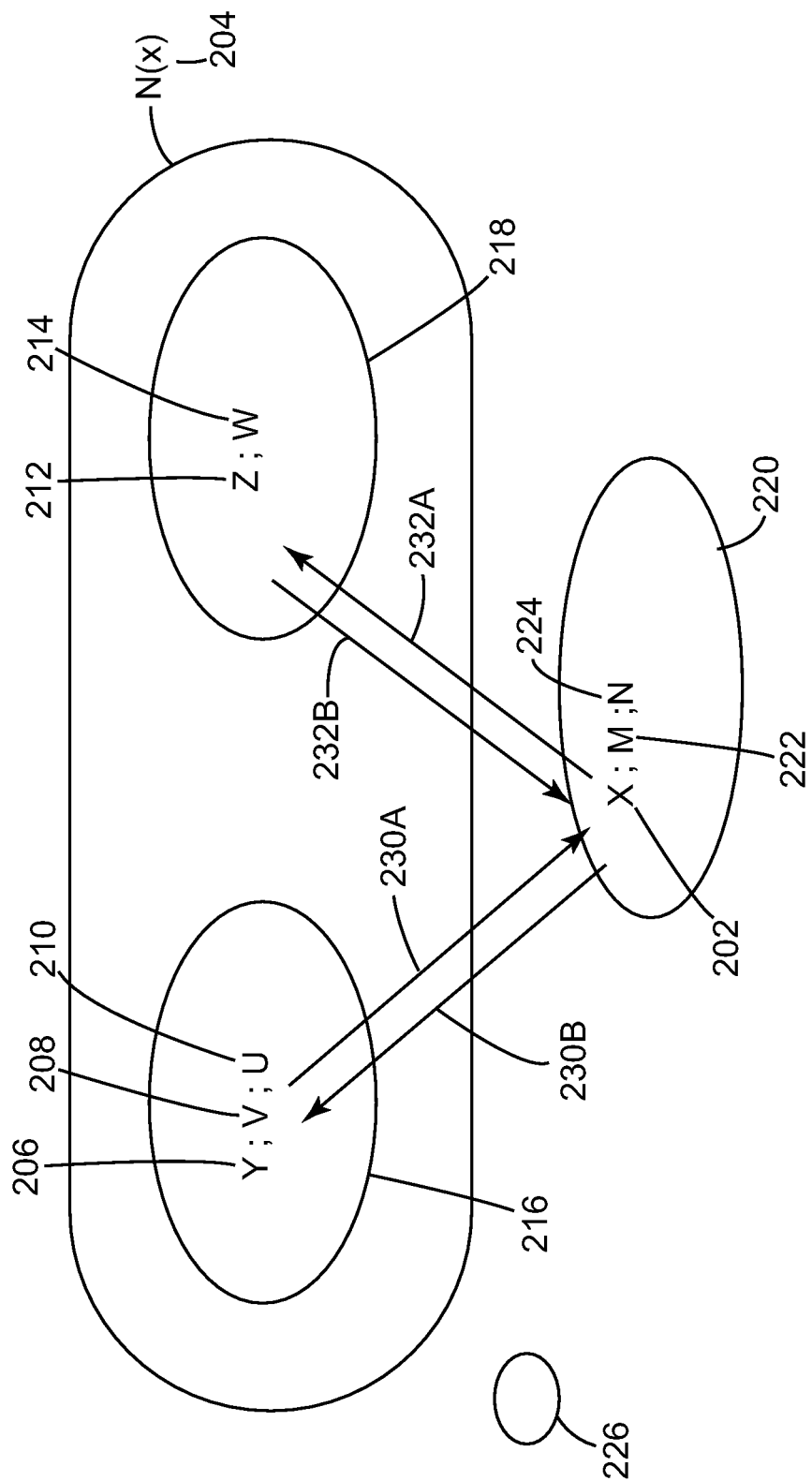
FIG. 2 is a schematic diagram of a current node and its neighbor nodes having a failure detection mechanism according to an exemplary embodiment.

This novel mechanism is now explained in more detail with regard to FIG. 2. A distributed network 200 has N nodes, where each node is connected to some other nodes in the network. FIG. 2 shows, for simplicity, only a handful of nodes 202, 206, 208, 210, 212, 214, 222, 224 and 226. A current node 202 is directly linked to nodes 206, 208, 210, 212 and 214. These nodes 206, 208, 210, 212 and 214 are the neighbor nodes of node 202. They form a Neighbor Set (NS) of node 202. The neighbor set is denoted as N(x) or 204. Similarly, node 212 has neighbor nodes 202, 222 and 224 and these nodes form the neighbor set N(Z) 220 of the node 212. All the other nodes in the network are represented by a generic element 226.

The nodes 206, 208, 210, 212 and 214 in the neighbor set 204 are assigned to an active group 216 (that includes active nodes 206, 208 and 210) and a passive group 218 (that includes passive nodes 212 and 214). It is assumed in the following that the neighborhood relationships among the nodes is already established by the underlying overlay protocol, e.g., the P2P Chord or other distributed protocols. In other words, the current node knows its neighbor nodes, and the current node can communicate with the neighbor nodes and the basic information (e.g., ID and IP address) of the nodes has been exchanged. When a node joins or leaves the network, its neighbor nodes shall update their Neighbor Set 204 and related parameters based on the existing protocols.

With this structure in place, the keep-alive information is shared among the nodes of the neighbor set 204 of the current node 202, i.e., each node in the neighbor set 204 does not need to periodically exchange keep-alive message with current node 202 as in the existing mechanisms. Instead, according to this novel method, the nodes in the neighbor set 204 are considered to be part of a same group and this group needs only exchange keep-alive message with the current node 202 at a fixed interval, e.g., a predetermined time interval.

In other words, the nodes 206, 208, 210, 212 and 214 of the neighbor set 204 exchange the keep-alive message with the current node 202 in a predetermined sequence, i.e., node 206 first, after the predetermined time interval, node 208 exchanges the keep-alive message with the current node 202, and so on. Further, as will be discussed later, not all the nodes in the neighbor set 204 send a keep-alive message to the current node 202 but only the active nodes. If a neighbor node, e.g., node 208, in the neighbor set 204 has detected the failure of the current node 202, the node 208 shall share this information with all other nodes in the neighbor set 204.

Figure 3:
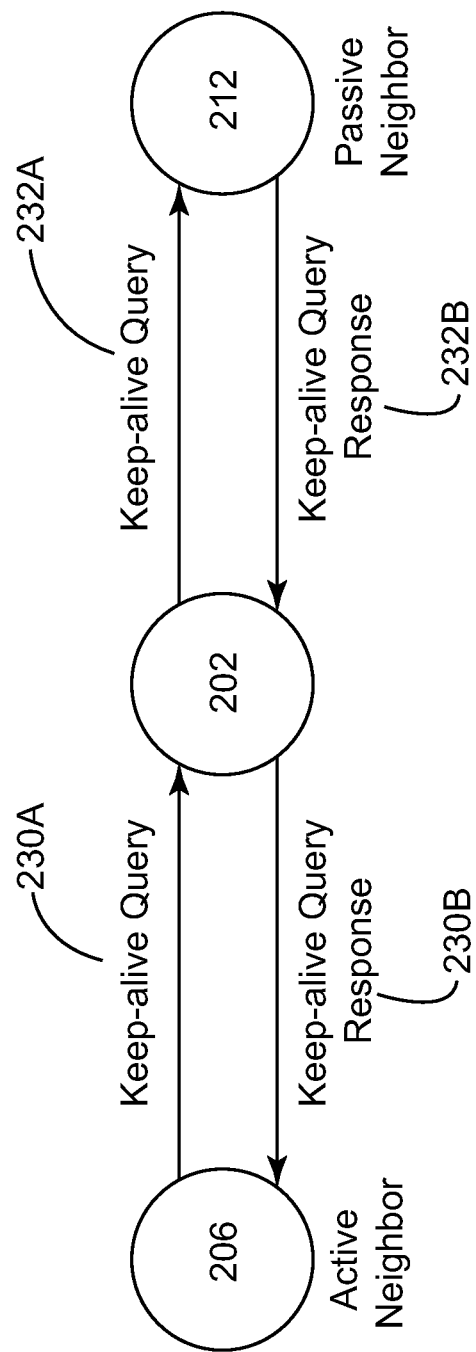
FIG. 3 is a schematic diagram that illustrates how keep-alive messages are exchanged between passive and active nodes according to an exemplary embodiment.

In addition, to further reduce the failure detection time, the keep-alive information is shared bidirectional between two nodes as shown, for example, in FIG. 3. FIG. 3 shows node 202 having two neighbours 206 and 212, with node 206 being an active node and node 212 being a passive node. This means that node 206 sends a keep-alive query 230A to node 202 and node 202 replies with a keep-alive query response 230B to node 206. However, the node 202 does not send a keep-alive query to the node 206.

Similarly, as node 202 is the active node for the passive node 212, only the node 202 sends a keep-alive query 232A to the passive node 212 and only the passive node 212 sends a keep-alive query response 232B back to the node 202. In other words, the traffic between these nodes is reduced as the node 202 does not send a keep-alive query to the active node 206 and the passive node 212 does not send a keep-alive query to the node 202. Thus, the node 212 detects the failure of the node 202 by checking whether it has received the keep-alive message 232A from the node 202 before an expected time. If not, then node 212 will assume that the node 202 had failed and a keep-alive message is sent to the node 202 to actively confirm that the node 202 has permanently failed.

The same is true for node 202 in determining whether node 206 has failed. In other words, the active node 206 detects the status of the node 202 by periodically sending the keep-alive query message 230A. If the active node 206 does not receive a response from node 202, then active node 206 shall consider that node 202 has failed and shall send a confirmation message to that effect to node 202. The passive node 202 shall detect the status of the active node 206 by checking whether a keep-alive query message 230A is received from node 206 during an expected time. If the node 202 does not receive a query message from node 206 before the expected time, then node 202 shall consider that node 206 has failed and shall send a message to that effect to node 206.

To implement this novel mechanism, according to an exemplary embodiment, each node needs to maintain two lists: an Active Neighbor List (ANL) and a Passive Neighbor List (PNL). The ANL is configured to include the current node's active neighbors while the PNL is configured to include the current node's passive neighbors. The active and passive roles are symmetric. For example, if node 202 is the active node for node 212, then node 212 is the passive node for node 202. In addition, one node can work as active neighbor and passive neighbor at the same time, e.g., node 202 in FIG. 3. However, given a certain neighbor, the node's role is unique, e.g., node 202 is the active node for node 212.

As mentioned above, if the current node 202 in the neighbor set 220 in FIG. 2 has detected the failure of node 212, node 202 should notify the failure of node 212 to all other nodes 222 and 224 in the neighbor set 220. However, in a real distributed system, it is possible that node 202 may not be able to communicate directly with all other nodes in the neighbor set 220. In other words, one of the nodes 222 and 224 may be unreachable by node 202.

Therefore, the failure information related to the failed node 212 could not be shared with some neighbor nodes of the failed node 212. According to another exemplary embodiment, the current (detecting) node 202 is configured to ask other reachable neighbor nodes in the neighbor set 220 to forward such failure information to those unreachable nodes. For example, still with regard to FIG. 2, consider that the current node 202 can directly reach node 222 but not node 224. Then, the current node 202 keeps track that no response was received from node 224, when failure information was sent to it and, thus, the current node 202 sends a message containing the ID and other information of the unreachable node 224 to other reachable nodes (222) in the neighbor set 220. The reachable node 222 then forward the failure information related to the failed node 212 to the unreachable node 224.

With the proposed novel mechanism, the node failure can be detected quickly while the signaling overhead is significantly decreased. Thus, the overall performance of the distributed system is improved compared with the existing mechanisms. The above discussed novel mechanism is now discussed in more detail.

A Neighbor Set Table (NST) may be automatically maintained in each node to store the information of its neighbor nodes in the distributed system. In NST, for each neighbor node there is an entry including the following fields: Node ID, IP address, and Neighbor List. The Node ID is used to uniquely represent the node in the distributed overlay network, e.g., in the P2P network, the ID is the node's Peer ID. The IP address is used to transfer messages, including keep-alive messages, between the nodes. The Neighbor List contains the neighbor set of nodes of the node represented by the Node ID of the current entry. When the current node detects the failure of one of its neighbor nodes, it shall notify the neighbor list of that neighbor node.

Table 1 shows an example of the NST for the node 212. From the table, it can be seen that node 212's neighbor nodes include nodes 202, 222, and 224. The IP address of node 202 is "192.168.0.100," and node 202's neighbors include nodes 206, 1208, 210, 212, and 214. The IP address of node 222 is "192.168.0.200" and node 222's neighbors include nodes c and d, and so on.

TABLE 1

A sample Neighbor Set Table of node 212

| Node ID | IP address | Neighbor List |
|---|---|---|
| 202 | 192.168.0.100 | (206, 208, 210, 212, 214) |
| 222 | 192.168.0.200 | (c, d) |
| 224 | 192.168.0.105 | (e, f, g) |

The NST table should be constructed and updated dynamically when a neighbour node joins or leaves the network.

In addition to the NST, a node should include the ANL and the PNL. As mentioned above, when exchanging keep-alive message with its neighbors, each node can work either as an active neighbor or passive neighbor. The ANL contains the current node's neighbors which work as active neighbors, and the PNL contains the current node's neighbors which work as passive neighbors. The ANL of the current node associates each active neighbor with one Node ID and one Expected Timer. The Expected Timer indicates the time when that active neighbor should send a keep-alive query message to the current node. The expected timer may be controlled by the current node. The PNL of the current nodes associates each passive neighbor with one Node ID and one Sending Timer. The Sending Timer indicates the time when the current node should send a keep-alive query message to that passive neighbor.

Thus, the ANL may be used to ensure that the current node's status is checked by the active nodes at a fix interval and the PNL may be used to check the passive nodes' status by sending them keep-alive query messages.

In one exemplary embodiment, the ANL and PNL are used together to determine the current node's status. The neighbor nodes in the ANL will send a keep-alive query message at a pre-defined time interval to the current node. If no response is received from the current node, the active neighbor node would consider that that current node may have failed and may start a retry mechanism to confirm that the current node has failed.

The passive nodes in the PNL determine the current node's status by checking if they received a keep-alive query message before the Expected Timer expires. If the passive neighbor nodes did receive a keep-alive query message from the current node before the Expected Timer, the passive nodes would conclude that the current node is still alive; otherwise, they would conclude that that current node is not reachable and they may start a retry mechanism to determine whether the current node had failed. Therefore, the current node's failure can be detected in both ways with a shorter detection time.

Each node may automatically maintain the NST, ANL and PNL. When a node joins the network, all of its neighbor nodes shall add the node into their NST, ANL and PNL. When a node leaves the network, all of its neighbor nodes shall remove the node from their NST, ANL and PNL.

The novel method described above may be implemented in various ways. One such way is described next. However, those skilled in the art would understand that variations of the presented approach or other approaches may be derived based on this disclosure.

According to an exemplary embodiment, five types of keep-alive messages may be used. These five types are: Keep-alive Query, Keep-alive Query Response, Keep-alive Notify, Keep-alive Notify Response and Keep-alive Notify Forward. The messages can be exchanged among the nodes in the payload of a TCP or UDP packet. Each type of keep-alive message is now discussed.

Figure 4:
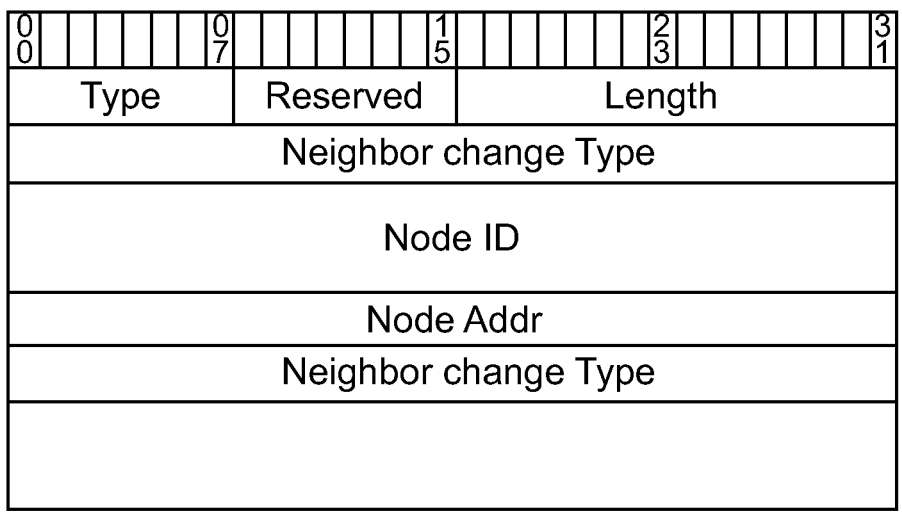
FIG. 4 is a schematic diagram of a keep-alive query message format according to an exemplary embodiment.

The Keep-alive Query (KQ) message may used to query the neighbor node's status. The node may also use the KQ message to communicate the changes of its neighbor nodes. The KQ message may include the fields illustrated in FIG. 4. These fields may be a Type field, which may be an 8-bit field to indicate the type of the keep-alive message. In this example, the type is set to 1 to indicate a keep-alive query message. This field is common for all keep-alive messages. The next field is Reserved. This field may be an 8-bit field and it may be reserved for future use. The next filed is Length. This field may be a 16-bit field to indicate the length of the keep-alive message. This field is also common for all keep-alive messages. The next field is Neighbor Change Type. This field may be a 32-bit field to indicate the change of the neighbor nodes. If the field is 0, it indicates that the node represented by the following Node ID field is removed from its Neighbor Set because of the last message exchange. If the field is 1, it indicates that the node represented by the following Node ID field is added into its Neighbor Set. The next field is the Node ID. The Node ID may be a 32-bit field to represent the node. The next field is the Node Addr. This field is a 32-bit field to represent the IP address of the node represented by the Node ID. For IPv6, this field shall be set to 128 bits. In the Keep-alive Query or Keep-alive Query Response messages, one or more Neighbor Change Type and Node ID fields can be included. A Node ID field and a Node Addr field must be associated with a corresponding Neighbor Change Type field.

The next type of keep-alive message is the Keep-alive Query Response (KQR). After a keep-alive query message is received at a passive node from its neighbor node (active node), the passive node should send back a KQR message to indicate its current status. Also, the passive node may use this message to indicate the change of its neighbor nodes. This message may also be used to control when the active node should send the next keep-alive query message. In other words, a passive node may control a timing of receiving keep-alive query messages by sending to the active nodes the appropriate sending times.

Figure 5:
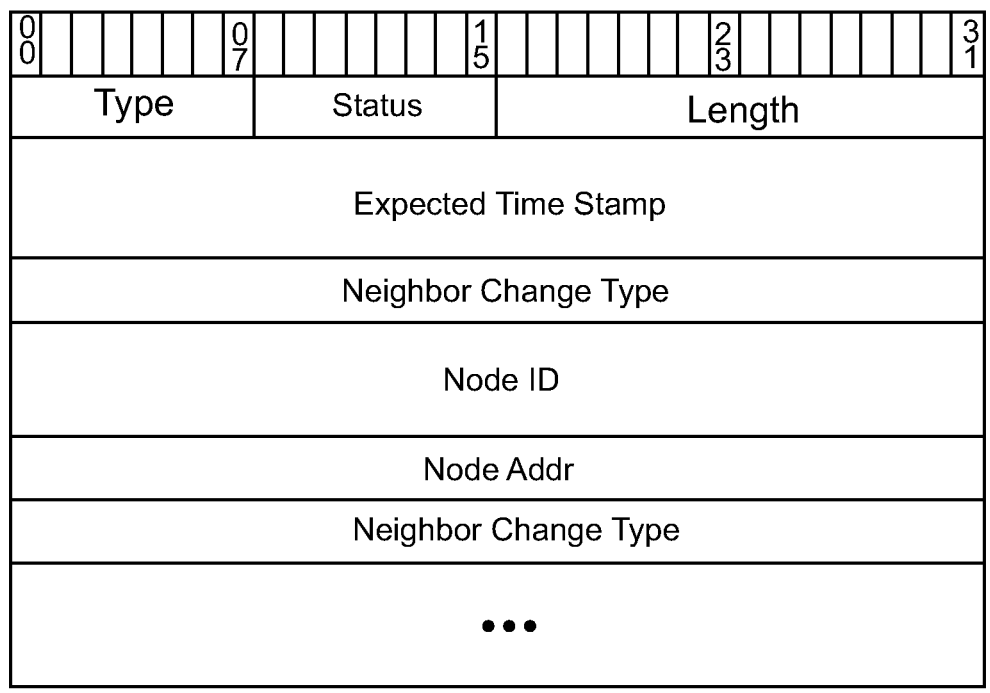
FIG. 5 is a schematic diagram of a keep-alive query response message format according to an exemplary embodiment.

A format of the keep-alive query response is illustrated in FIG. 5. The keep-alive query response may include the following fields. A first field is the Type. This field may be set to 2 for a keep-alive query response message. Another field is the Status. This field may be an 8-bit field to indicate the status of the node. A value of 0 indicates that this is a response message to a query message. A value of 1 indicates that this is an unsolicited response message. The next filed is the Expected Time Stamp. This field may be a 64-bit field to show the time when the next keep-alive query message should be sent. The format of the NTP timestamp may be adopted. This may be a 64-bit, unsigned, fixed-point number in seconds, relative to 0 h on 1 Jan. 1900. The integer part is in the first 32 bits and the fraction part in the last 32 bits. The remaining fields have the same meaning as those discussed above with regard to the keep-alive query message.

Figure 6:
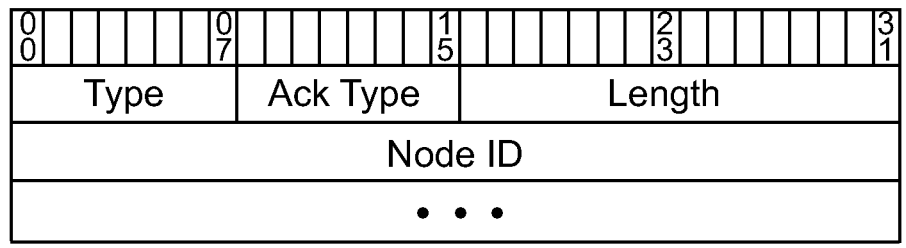
FIG. 6 is a schematic diagram of a keep-alive notify message format according to an exemplary embodiment.

The next type of keep-alive message is the Keep-alive Notify (KN) message. The format of this message is illustrated in FIG. 6. After a current node has detected that one neighbour node has failed, the current node sends the keep-alive notify message to all known neighbour nodes of the failed node. The keep-alive notify message may include various fields. A first field may be Type. This field may be set to 3 for the keep-alive notify message. Another filed may be AckType. This field may be an 8-bit field to indicate if the message requires a response message. If the field is set to 1, a response message is required; otherwise, a response message is not required. Another field may be Node ID. This field may be a 32-bit field to represent the failed node. One or more Node ID field can be included in this message.

Figure 7:
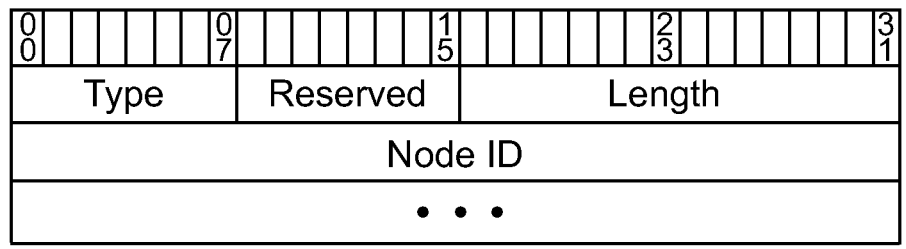
FIG. 7 is a schematic diagram of a keep-alive notify response message format according to an exemplary embodiment.

The next type of keep-alive message is the Keep-alive Notify Response (KNR) message. The format of this message is illustrated in FIG. 7. After a node has received a KN message, the node should send the keep-alive notify response message to the sender as the acknowledgement. The KNR message may include plural fields. One field is Type. This field may be set to 4 for the keep-alive notify response message. Another field may be Reserved. This field may be an 8-bit field reserved for future use. Still another field may be Node ID. This field may be the same as in the keep-alive notify message.

Figure 8:
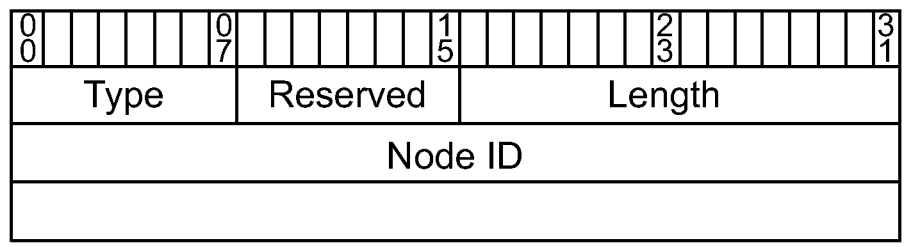
FIG. 8 is a schematic diagram of a keep-alive notify forward message format according to an exemplary embodiment.

The last type of keep-alive message may be the Keep-alive Notify Forward (KNF). A structure of this message is shown in FIG. 8. After sending a keep-alive notify message to a neighbour node of the failed node, if the current node does not receive the keep-alive notify response message, the current node may conclude that the neighbour node of the failed node is unreachable. The current node records all unreachable nodes, adds them to a KNF message and sends it to, for example, random selected reachable nodes. The KNF message may include plural fields. A first field is Type. This field may be an 8-bit field which may be set to 5. Another field is Reserved. This 8-bit field is reserved for future use. The next field may be Node ID. This field may be a 32-bit field to represent the failed node. One or more Node ID fields can be included in this message.

To further reduce the overhead signalling, one option is that the keep-alive notify, the notify response and the notify forward messages can also be used implicitly to indicate the aliveness of the sending node.

The novel process noted above is now discussed with regard to FIG. 9. The process may be divided, for example, into four phases: preparation and setup, keep-alive message exchange, failure detection and failure notification. Thus, each phase is now discussed in turn.

The preparation and setup phase may include a few steps as discussed next. One step is related to setting up the neighbourhood set. When a new node joins the network, its neighbor nodes setup the neighbor set to include the new node. According to this exemplary embodiment, it is assumed that the underlying distributed overlay protocol is responsible for (1) the establishment of the neighborhood, i.e., decide which nodes shall be the neighbors of the new node, (2) the configuration of the transport layer, (3) the exchange of basic information (e.g., Node ID and IP Address), etc.

Figure 9:
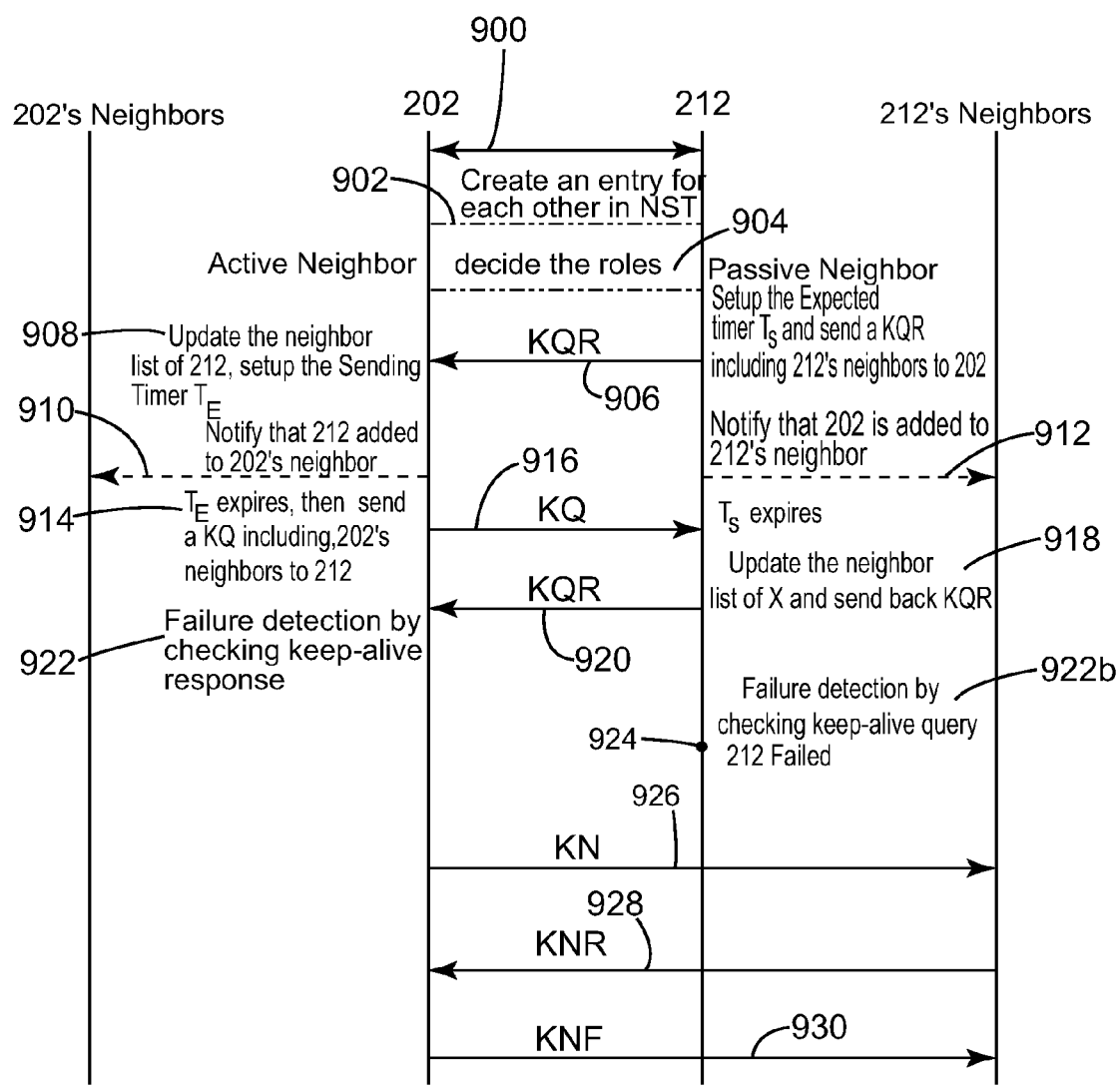
FIG. 9 is a schematic diagram illustrating various steps that take place among nodes to detect a failed node according to an exemplary embodiment.

With regard to FIG. 9, it is assumed that node 202 (IP address is 192.168.0.1 and current neighbors include nodes 206, 208, 210, 212, 214) has established neighboring relations with node 212 (IP address is 192.168.0.100 and current neighbors include nodes 222 and 224) in step 900, using the underlying overlay protocol, e.g., Chord and Partry, and these two nodes need to detect each other's status (i.e., live or failed) by using the proposed keep-alive mechanism.

Thus, the two nodes 202 and 212 already know each other's Node ID and IP address and can communicate with each other. Then, the nodes 202 and 212 create in step 902 an entry for each other in their Neighbor Set Table and fill out each field (including Node ID and IP Address) except the Neighbor List field. For example, node 202 should add an entry for 212 into its NST as described in Table 2 below. The neighbor list of 212 is now empty. The neighbor list will be filled through the exchange of the keep-alive messages as described later.

TABLE 2

| Node ID | IP address | Neighbor List |
| --- | --- | --- |
| 212 | 192.168.0.100 | empty |

Before exchanging keep-alive messages, the roles of the two communicating nodes are decided in step 904: one should be active, and the other should be passive. For example, the length (number of nodes) of the Active Neighbour List of each node may be used to determine the role of each node. Assume that $L_{202}$ is the length of the Active Neighbour List of node 202 and $L_{212}$ is the length of the Active Neighbour List of node 212. If $L_{202} > L_{212}$, then node 202 should work as the active node and add node 212 to its Passive Neighbour List; node 212 should set itself as the passive node and add node 202 to its Active Neighbour List. If $L_{202} = L_{212}$ or both Active Neighbour Lists are empty, the Node ID could be used to decide the roles of the two nodes, e.g., the node with smaller Node ID shall behave as the active node and the other node shall behave as the passive node. The exchange of the length of the Active Neighbour List could be achieved by using the underlying overlay protocol and is not described here. For this embodiment, it is assumed that node 202 is the active neighbour and node 212 is the passive neighbour.

Then, node 212 sends in step 906 a keep-alive query response message containing its current neighbour nodes (i.e., nodes 222 and 224) and the expected sending time $T_s$ when node 202 should send the next keep-alive query message. It is noted that in this initiation phase, node 212 sends the keep-alive query response message without receiving first a keep-alive query message.

The expected sending time $T_s$ may be calculated as follows: $T_s=T_l+k$, where $T_l$ is the time when the last node in the Active Neighbour List of node 212 sends a keep-alive query message to node 212, and k represents a pre-defined time interval in which the distributed system want to detect the node failure. In one exemplary embodiment, the pre-defined time interval k is the same for all the nodes. Thus, according to this exemplary embodiment, the passive node can control a time when to receive the keep-alive query message.

After $T_s$ is calculated, node 212 fill this information into the field "Expected Time Stamp" of the keep-alive query response message and sends this information to node 202. At the same time, the node 212 should associate a time value $T_e$ (Expected Timer in ANL) with node 202. Thus, node 212 expects to receive a keep-alive message from node 202 before the time $T_e$. When considering the time shift and network delay, the time $T_e$ should be set to a latter later than $T_s$, e.g., $T_e=T_s+\zeta$, where $\zeta$ is a pre-defined value, e.g., 1 s. It is noted that the time of the nodes in the distributed network is assumed to be already synchronized by some means, e.g., Network Timestamp Protocol.

In step 908, the node 202 updates its neighbour list and set up the sending timer time $T_e$. In other words, after the keep-alive query response message from node 212 is received in step 906, node 202 updates its Neighbor Set Table if there is any change of node 212's neighbors, and also updates the Sending Timer for node 212 in the Passive Neighbor List with the value of the Expected Time Stamp field. The NST of node 202 is updated so that nodes 222 and 224 are added into the Neighbor List of node 212.

In steps 910 and 912, each of the two nodes 202 and 212 notify their respective neighbors about the new neighbors 202 or 212. This notification may be implemented when sending the keep-alive query/response messages the next time. For example, node 202 should notify nodes 206, 208, 210, 214 that node 212 is added into their neighbours set 204 and node 212 should notify nodes 222 and 224 that node 202 is added to their neighbours set 220.

Having completed the preparation and setup phase, the method advances to the keep-alive message exchange phase. According to this phase, when the Sending Timer $T_e$ for node 212 expires in step 914, node 202 should send in step 916 a keep-alive query message KQ to node 212. Node 202's neighbor change should also be included in this message KQ.

If the keep-alive query message KQ is received from node 202, node 212 should parse the message in step 918 to detect if there is any neighbor change. If yes, node 212 should update the Neighbor List of node 202. Then, node 212 should send a keep-alive query response KQR message in step 920, having a similar content to the message described in step 906. The Expected Timer $T_e$ should be reset at node 202, similar to step 908.

The next phase is the failure detection phase. In this phase, if the current node 202 does not receive in step 922a a response after sending a keep-alive query message to its neighbor node 212, it may re-send a keep-alive query message during a pre-defined interval. If there is still no reply from the neighbor node 212, the current node 202 should conclude in step 924 that the neighbor node 212 has failed.

It is noted that node 202 may fail and node 212 may detect the failed node. In this case, node 212 monitors in step 922b keep-alive messages sent by node 202 to determine whether node 202 has failed. If no message is received from node 202, node 212 should actively send a keep-alive message to the failed node 202. If no reply is received from the failed node 202, the current node 212 should re-send a keep-alive message in a pre-defined interval. If still no reply is received from the failed node 202, the current node 212 should consider in step 924 that node 202 has failed.

Having determined a failed node, next comes the failure notification phase, i.e., the current node needs to inform the neighbours of the failed node about this event. More specifically, if node 212 has failed and it is detected by node 202, as discussed above, then node 202 sends in step 926 the failure information with a keep-alive notify message KN to all other nodes (222, 224) in the neighbor list of node 212. If a neighbor node 222 of the node 212 receives the notification message, it should remove the entry of node 212 from its Neighbor Set Table and send in step 928 a Keep-alive Notify Response message KNR to node 202.

Because it is likely that node 202 cannot communicate directly with all neighbor nodes 222 and 224 of the failed node 212, it may happen that at least one neighbor node 224 of node 212 may not be informed in time, by the current node 202, about the failure of node 212. For this situation, the current node 202 records if a reply of its status-notify message is received from nodes 222 and 224.

If the current node 202 does not receive a Keep-alive Notify Response from the neighbor node 224 of node 212 in a pre-defined time interval, then the current node 202 concludes that the neighbor node 224 of node 212 is unreachable. In this case, node 202 generates a Keep-alive Notify Forward message KNF, which contains all unreachable neighbor nodes of node 212, and sends in step 930 this message to a number of, for example, randomly selected reachable neighbor nodes 222 of node 212. After received the Keep-alive Notify Forward message, the selected reachable neighbor nodes 222 generate a Keep-alive Notify message and send this message to those nodes specified in the KNF message. To reduce the overhead signaling, no response for this message is expected. It is noted that some nodes still cannot receive the Keep-alive Notify message for the failed node 212, in which case the failure detection may take longer. After receiving the message KN or KNF, the neighbor nodes 222 and 224 of the failed node 212 remove the entry of node 212 from their NST, PNL and/or ANL.

Figure 10:
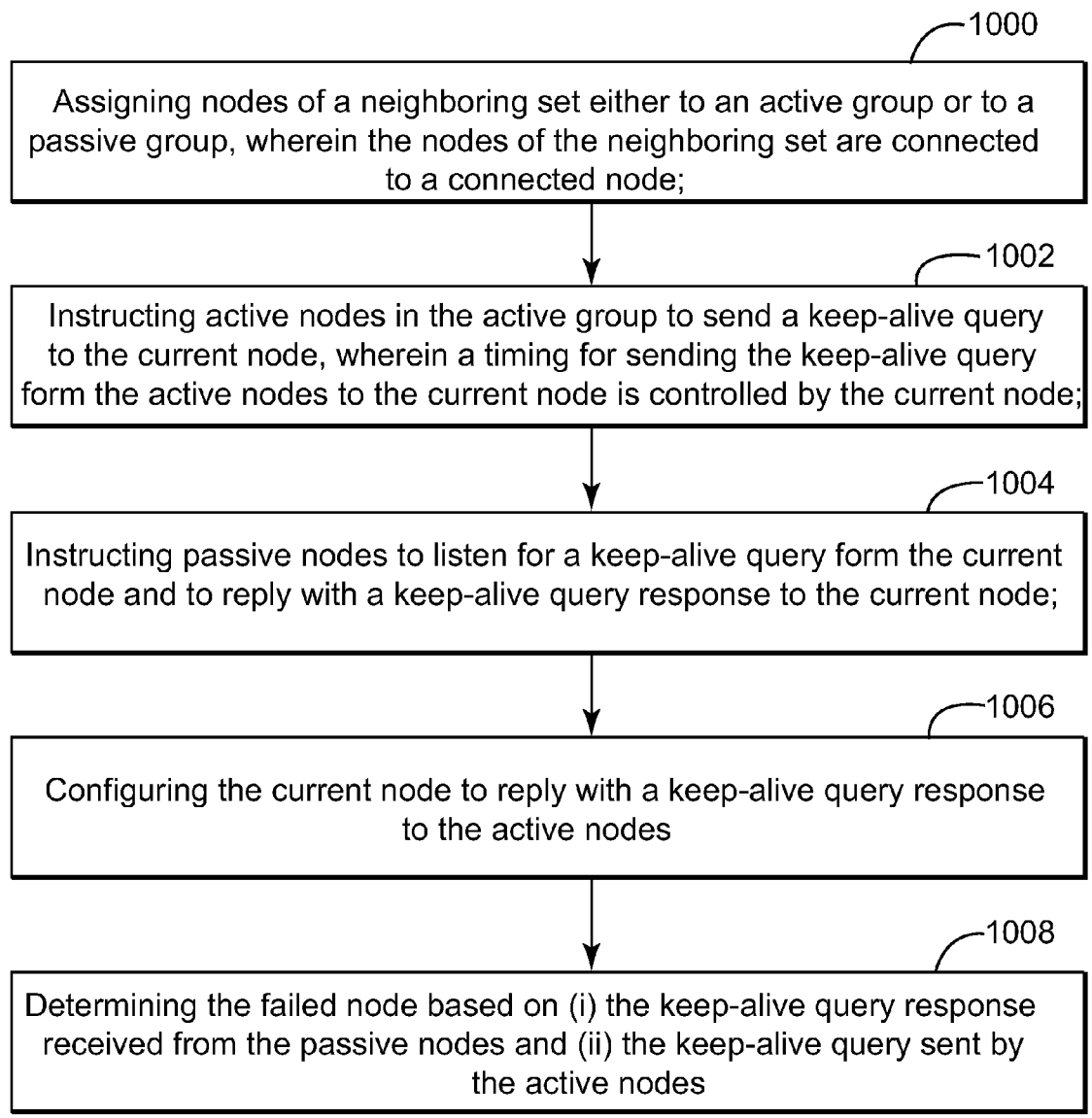
FIG. 10 is a flowchart of a method for determining a failed node according to an exemplary embodiment.

The above-discussed novel mechanism may be implemented as a method as discussed next with regard to FIG. 10. According to an exemplary embodiment, the method includes a step 1000 of assigning nodes of a neighboring set either to an active group or to a passive group, wherein the nodes of the neighboring set are connected to a current node; a step 1002 of instructing active nodes in the active group to send a keep-alive query to the current node, wherein a timing for sending the keep-alive query from the active nodes to the current node is controlled by the current node; a step 1004 of instructing passive nodes to listen for a keep-alive query from the current node and to reply with a keep-alive query response to the current node; a step 1006 of configuring the current node to reply with a keep-alive query response to the active nodes; and a step 1008 of determining the failed node based on (i) the keep-alive query response received from the passive nodes and (ii) the keep-alive query sent by the active nodes.

The performance of the proposed new mechanism is compared now with the previous mechanisms, i.e., the basic and cooperative keep-alive mechanisms. Two performance metrics are usually used for the analysis of the keep-alive mechanisms: (1) average detection time and (2) overhead signaling.

For the basic keep-alive mechanism, consider that $t_f$ is the time when a node fails, and $t_s$ is the time when a neighbor node sends a keep-alive query message to the failed node.

Then, $t_s-t_f$ represents the detection time of the failed node. Consider that λ is the pre-defined time interval during which a keep-alive query message is sent. Then, it is natural to assume that $(t_s-t_f)$ has a uniform distribution on [0, λ]. Therefore, based on the probability theory, the average detection time θ to detect a node failure is λ/2. Regarding the second metric, the overhead signaling for the standard mechanism includes keep-alive queries and responses. Each node sends a query message to each neighbor every λ seconds. Thus, the number of keep-alive messages (queries and responses) introduced by a node with d neighbor nodes during λ seconds is 2d.

For the cooperative keep-alive mechanism, the other traditional mechanism, a node receives a keep-alive query message from all neighbour nodes every λ seconds. Therefore, the average detection time is the same as in the basic method, i.e., θ=λ/2. Because only one keep-alive query message is sent by all of its neighbour nodes, the number of keep-alive messages introduced by a node with d neighbour nodes during λ seconds is 2. It can be seen that the overhead signalling is independent of the number of its neighbour nodes.

Regarding the novel mechanism proposed in this document, similar to the Cooperative Keep-alive solution, to detect a failed node, only one keep-alive query message is sent by all of its neighbour nodes. Therefore, the number of keep-alive messages introduced by a node with d neighbour nodes during λ seconds is 2. As noted above, the overhead signalling is independent of the number of its neighbour nodes.

However, compared to the standard and cooperative mechanism, the failure detection time of the novel mechanism is reduced. Let $t_f$ be the time when a node fails, $t_s$ be the time when a neighbour node sends a keep-alive query message to the failed node, and $t_d$ be the expected time when the failed node should send a keep-alive query message to its neighbour nodes. Then, the detection time is the minimum of $(t_s-t_f)$ and $(t_d-t_f)$. Assume that λ is the time interval during which a keep-alive query message is sent, and both $(t_s-t_f)$ and $(t_d-t_f)$ have a uniform distribution on [0, λ]. According to the probability theory, the average detection time is θ=λ/3. Compared to the basic and cooperative keep-alive solutions, this novel approach reduces the average detection time by ⅓ while still maintains the low signalling overhead.

Thus, from the above analysis, it can be seen that the novel mechanism advantageously reduces the signalling overhead and the failure detection time compared to the existing mechanisms, which is useful for nowadays large-scale distributed networks.

Figure 11:
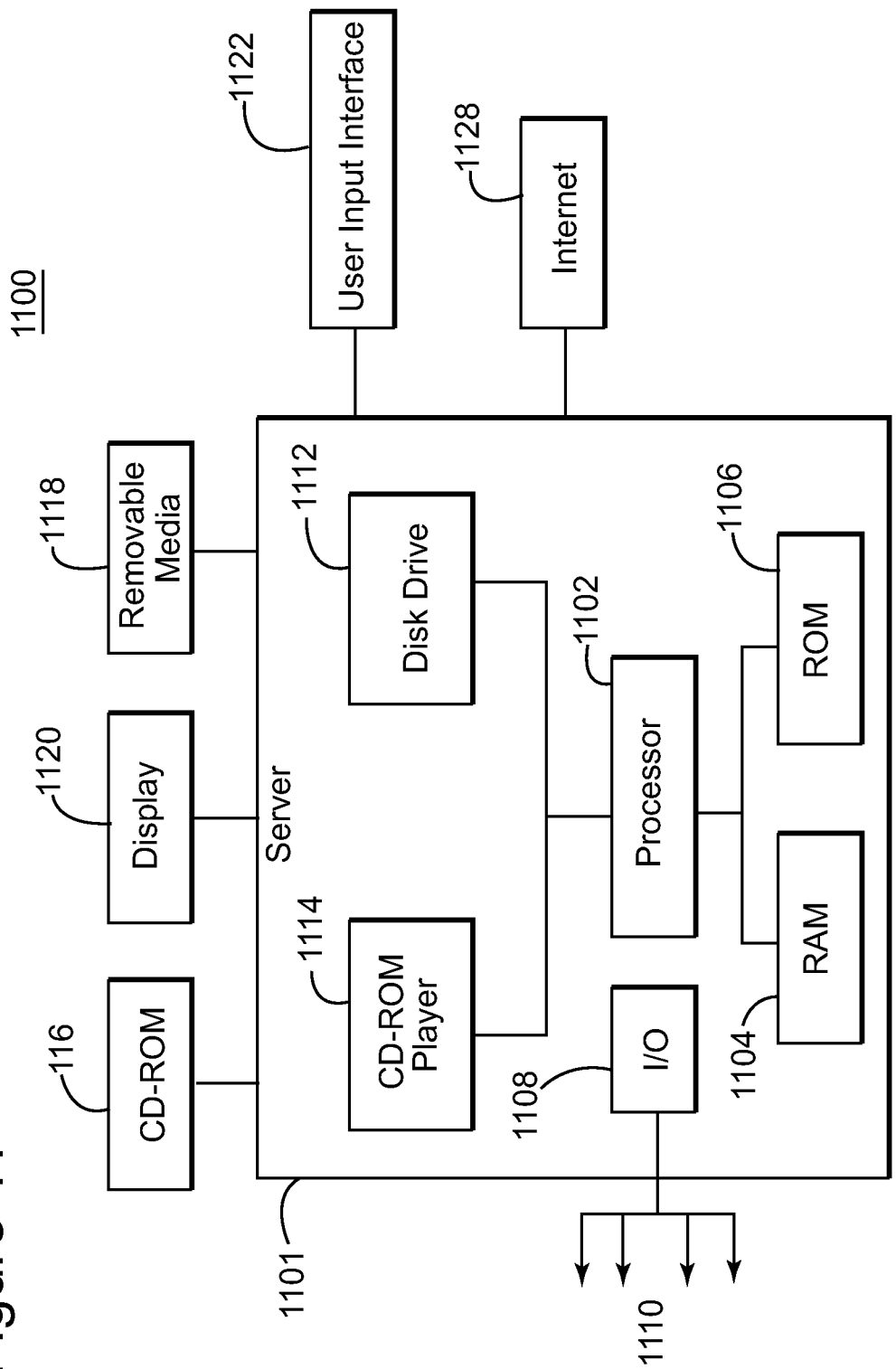
FIG. 11 is a schematic diagram of a node that implements a method for detecting a failed node according to an exemplary embodiment.

For purposes of illustration and not of limitation, an example of a representative node structure capable of carrying out operations in accordance with the exemplary embodiments is illustrated in FIG. 11. Hardware, firmware, software or a combination thereof may be used to perform the various steps and operations described herein.

The exemplary node structure 1100 suitable for performing the activities described in the exemplary embodiments may include or not a server 1101. Such a server 1101 may include a central processor (CPU) 1102 coupled to a random access memory (RAM) 1104 and to a read-only memory (ROM) 1106. The ROM 1106 may also be other types of storage media to store programs, such as programmable ROM (PROM), erasable PROM (EPROM), etc. The processor 1102 may communicate with other internal and external components through input/output (I/O) circuitry 1108 and bussing 1110, to provide control signals and the like. The processor 1102 carries out a variety of functions as is known in the art, as dictated by software and/or firmware instructions.

The server 1101 may also include one or more data storage devices, including hard and disk drives 1112, CD-ROM drives 1114, and other hardware capable of reading and/or storing information such as DVD, etc. In one embodiment, software for carrying out the above discussed steps may be stored and distributed on a CD-ROM 1116, removable media 1118 or other form of media capable of portably storing information. These storage media may be inserted into, and read by, devices such as the CD-ROM drive 1114, the disk drive 1112, etc. The server 1101 may be coupled to a display 1120, which may be any type of known display or presentation screen, such as LCD displays, LED displays, plasma display, cathode ray tubes (CRT), etc. A user input interface 1122 is provided, including one or more user interface mechanisms such as a mouse, keyboard, microphone, touch pad, touch screen, voice-recognition system, etc.

The server 1101 may be coupled to other computing devices, such as the landline and/or wireless terminals, via a network. The server may be part of a larger network configuration as in a global area network (GAN) such as the Internet 1128, which allows ultimate connection to the various landline and/or mobile client/watcher devices.

The disclosed exemplary embodiments provide a node device, a method and a computer program product for more efficiently detecting a failed node in a distributed network. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for detecting a failed node in a structured network, the method comprising:

assigning nodes of a neighboring set either to an active group or to a passive group, wherein the nodes of the neighboring set are connected to a current node;

instructing active nodes in the active group to send a keep-alive query to the current node, wherein a timing for sending the keep-alive query from the active nodes to the current node is controlled by the current node;

instructing passive nodes to listen for a keep-alive query from the current node and to reply with a keep-alive query response to the current node;

configuring the current node to reply with a keep-alive query response to the active nodes; and determining the failed node based on (i) the keep-alive query response received from the passive nodes and (ii) the keep-alive query sent by the active nodes, wherein the current node is configured to not send the keep-alive query to the active nodes and the passive nodes are configured to not send a keep-alive query to the current node.

2. The method of claim 1, further comprising:
maintaining at the current node an active list that includes only the active nodes and a passive list that includes only the passive nodes, wherein the active nodes and the passive nodes form the neighboring set of the current node.

3. The method of claim 1, further comprising:
determining that the failed node is a passive node if no keep-alive query response is received from the failed node in reply to the keep-alive query sent by the current node to the failed node.

4. The method of claim 1, further comprising:
determining that the failed node is an active node if no keep-alive query is received by the current node from the failed node at an expected time.

5. The method of claim 1, further comprising:
sending, from the current node, a keep-alive notification message to neighbor nodes of the failed node, wherein the keep-alive notification includes information that the failed node had failed.

6. The method of claim 5, further comprising:
maintaining a list with reachable neighbor nodes of the failed node,
wherein a reachable neighbor node is a node that replied to the current node in response to the keep-alive notification message.

7. The method of claim 6, further comprising:
maintaining a list with neighbor nodes of the failed node that are not reachable.

8. The method of claim 7, further comprising:
randomly selecting a predetermined number of nodes from the list of reachable neighbor nodes.

9. The method of claim 8, further comprising:
sending, from the current node, to the randomly selected reachable neighbor nodes the list with the unreachable neighbor nodes to be informed about the failed node.

10. The method of claim 1, further comprising:
removing the failed node from various tables or lists maintained by the current node.

11. A current node configured to detect a failed node in a structured network, the node comprising:
a processor configured to assign nodes of a neighboring set to either an active group or to a passive group, wherein the nodes of the neighboring set are connected to the current node; and
an interface configured to,
receive a keep-alive query from active nodes in the active group,
send a keep-alive query to passive nodes and receive a keep-alive query response from the passive nodes, and
send a keep-alive query response to the active nodes in response to the keep-alive query,
wherein the processor determines the failed node based on (i) the keep-alive query response received from the passive nodes and (ii) the keep-alive query sent by the active nodes, and
wherein the current node is configured to not send the keep-alive query to the active nodes.

12. The node of claim 11, wherein the processor is configured to not send a keep-alive query response to the passive nodes.

13. The node of claim 11, wherein the processor is further configured to:
maintain an active list that includes only the active nodes and a passive list that includes only the passive nodes, wherein the active nodes and the passive nodes form the neighboring set of the current node.

14. The node of claim 11, wherein the processor is further configured to:
determine that the failed node is a passive node if no keep-alive query response is received from the failed node in reply to the keep-alive query sent by the current node to the failed node, or
determine that the failed node is an active node if no keep-alive query is received by the current node from the failed node at an expected time.

15. The node of claim 11, wherein the processor is further configured to:
send a keep-alive notification message to neighbor nodes of the failed node.

16. The node of claim 15, wherein the processor is further configured to:
maintain a list with reachable neighbor nodes of the failed node,
wherein a reachable neighbor node is a node that replied to the current node in response to the keep-alive notification message.

17. The node of claim 16, wherein the processor is further configured to:
maintain a list with neighbor nodes of the failed node that are not reachable.

18. The node of claim 17, wherein the processor is further configured to:
randomly select a predetermined number of nodes from the list of reachable neighbor nodes.

19. The node of claim 18, wherein the processor is further configured to:
send to the randomly selected reachable neighbor nodes the list with the unreachable neighbor nodes to be informed about the failed node.

20. A non-transitory computer readable medium including computer executable instructions, wherein the instructions, when executed by a processor, implement a method for detecting a failed node in a structured network, the instructions comprising:
assigning nodes of a neighboring set either to an active group or to a passive group, wherein the nodes of the neighboring set are connected to a current node;
instructing active nodes in the active group to send a keep-alive query to the current node, wherein a timing for sending the keep-alive query from the active nodes to the current node is controlled by the current node;
instructing passive nodes to listen for a keep-alive query from the current node and to reply with a keep-alive query response to the current node;

configuring the current node to reply with a keep-alive query response to the active nodes; and determining the failed node based on (i) the keep-alive query response received from the passive nodes and (ii) the keep-alive query sent by the active nodes, wherein the current node is configured to not send the keep-alive query to the active nodes and the passive nodes are configured to not send a keep-alive query to the current node.

\* \* \* \* \*

UNITED STATES PATENT AND TRADEMARK OFFICE
CERTIFICATE OF CORRECTION

PATENT NO. : 9,338,050 B2
APPLICATION NO. : 14/384008
DATED : May 10, 2016
INVENTOR(S) : Cai

Page 1 of 1

It is certified that error appears in the above-identified patent and that said Letters Patent is hereby corrected as shown below:

On the Title Page, below item (54), insert item -- (71) Applicant: TELEFONAKTIEBOLAGET LM ERICSSON (PUBL), Stockholm (SE) --.

On the Title Page, in Column 1, delete item "(75)" and insert item -- (72) --, therefor.

In the Drawings:

In Fig. 11, Sheet 8 of 8, delete Tag "116" and insert Tag -- 1116 --, therefor.

In the Specification:

In Column 10, Line 26, delete "Partry," and insert -- Party, --, therefor.

Signed and Sealed this
Second Day of August, 2016

Michelle K. Lee
*Director of the United States Patent and Trademark Office*